Jan. 24, 1961
R. P. MOLT
2,969,254
COMPOSITE RUBBER-STEEL WHEEL TREAD
Filed Dec. 3, 1959
2 Sheets-Sheet 1
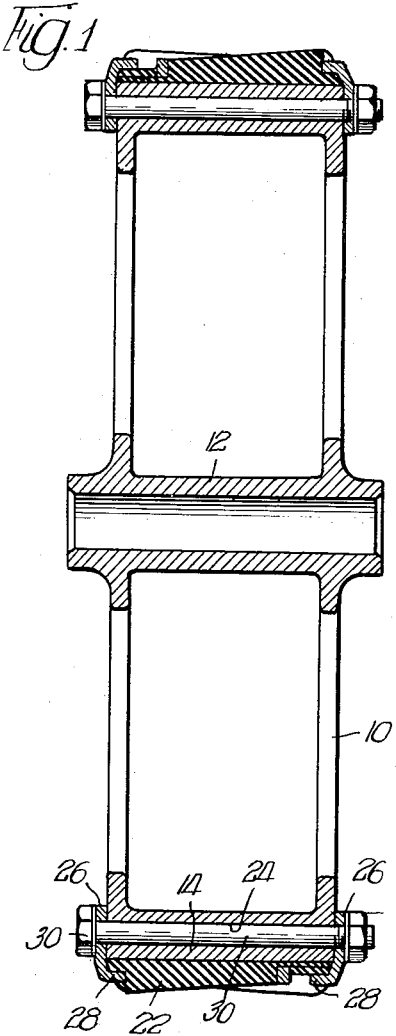
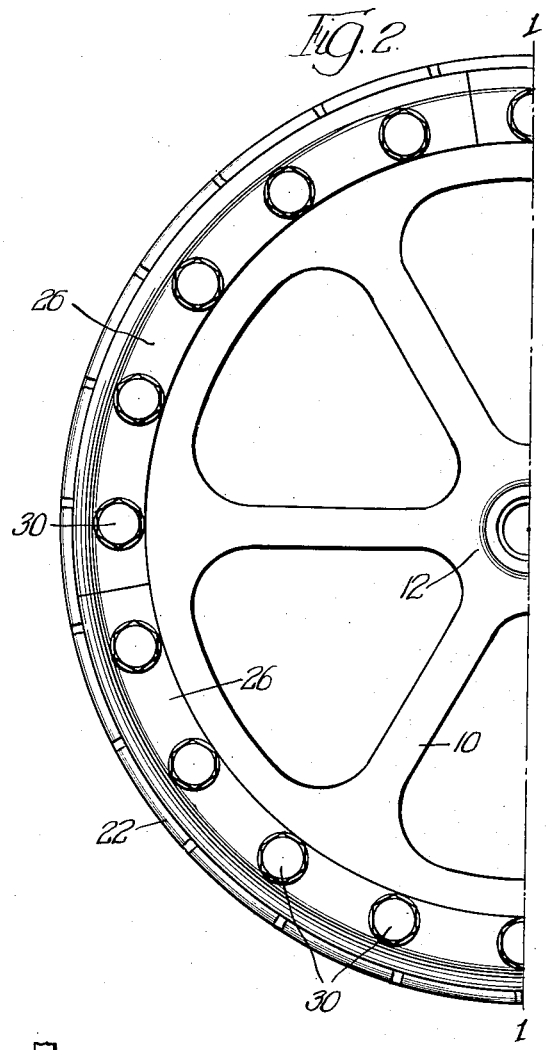
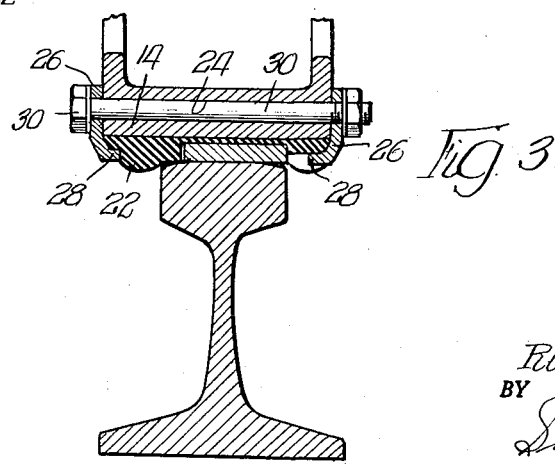
INVENTOR.
Richard P. Molt,
BY
Sabin C. Bronson.
ATTY Jan. 24, 1961  R. P. MOLT  2,969,254
COMPOSITE RUBBER-STEEL WHEEL TREAD
Filed Dec. 3, 1959  2 Sheets-Sheet 2

INVENTOR.
Richard P. Molt,
BY Sabin C. Bronson.

United States Patent Office 2,969,254
Patented Jan. 24, 1961

2,969,254
COMPOSITE RUBBER-STEEL WHEEL TREAD

Richard P. Molt, Olympia Fields, Ill., assignor to Stanray Corporation, Chicago, Ill., a corporation of Delaware Filed Dec. 3, 1959, Ser. No. 857,019

3 Claims. (Cl. 295—31)

This invention relates to improvements in vehicle traction wheels, and is concerned primarily with a composite rubber-steel wheel tread capable of operating on both ground surfaces and on steel rails.

The invention has for its pincipal objects the provision of a wheel having a tread surface which, when driving a vehicle on a rail would be capable of carrying loads normal and tangential to the tread surface exceeding the strength of any solid rubber tread facing in contact with the rail for the size of wheel required.

It is a further object of the invention to provide such a tread surface for a wheel which is capable of easy removal from the periphery of the wheel.

Wherever the term "rubber" is used herein, it is intended to mean not only natural vulcanized rubber suitable for the purpose, but also any of the synthetic elastomeric substitutes therefor.

The invention contemplates a vehicle drive wheel tread surface for load and traction purposes for operation over the ground and under light and medium load conditions, and further to provide a steel stop surface to act also as a support and traction member when the vehicle is in service on steel rails operating under heavy loads.

The invention will best be understood from the following description taken in connection with the accompanying drawing showing the invention and wherein like reference characters indicate like parts.

In the drawings:

Fig. 1 is a central cross sectional view of a vehicle wheel embodying the invention, taken on the line 1—1 of Fig. 2, and as the wheel would appear on the ground under light load.

Fig. 2 is a side elevation of one-half of the wheel shown in Fig. 1.

Fig. 3 is a vertical section of the wheel tread surface as it would appear under heavy load and on a railroad rail.

Figure 4:
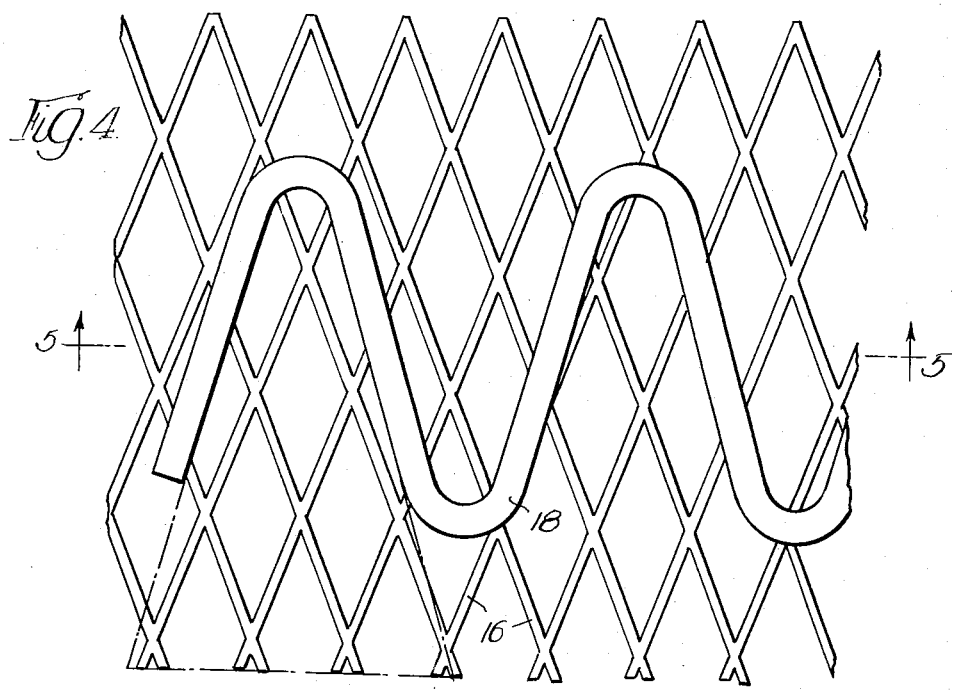
Fig. 4 is a plan view of a section of tread surface showing the sinuous steel bar brazed to flattened steel mesh and which extends around the periphery of the wheel.

In the drawings the numeral 10 indicates a wide rim vehicle wheel having a hub 12 and rim 14. My composite wheel tread is applied to the periphery of the rim 14.

Figure 5:
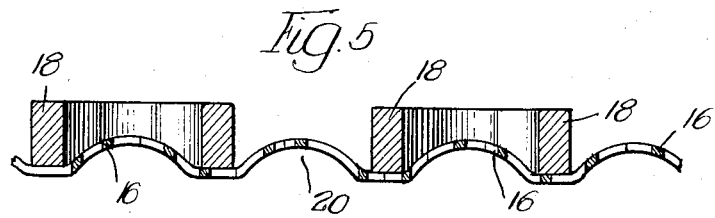
Fig. 5 is a section on the line 5—5 of Fig. 4.
Figure 6:
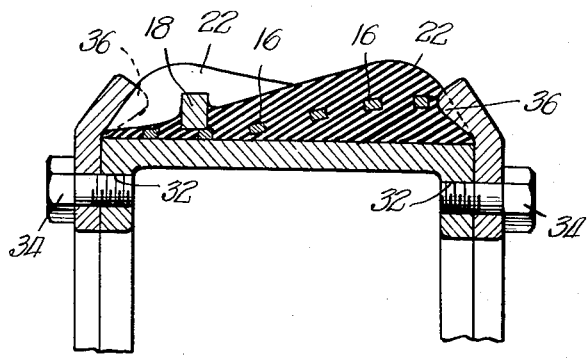
Fig. 6 is a slightly enlarged vertical sectional view through the periphery of the wheel showing the side bezels for holding the composite tread in place on the wheel.

A cylindrical band of flattened expanded steel mesh 16 approximating the diameter and width of rim 14 is provided, said mesh having a brass-plated surface for reasons hereinafter apparent. A sinusoidally shaped or zigzag steel bar 18 is brazed along one side to the steel mesh band 16 so as to continue all around the central portion of the band. Between the bends of the sinuous bar, from either edge of the mesh band 16 toward the bend in the bar 18 the band is bulged upwardly as shown in Fig. 5 at 20, somewhat in the form of a segment of a hollow cone. This forms a wavy edge at either side of the mesh, decreasing in extent toward the bend in the bar 18. Within the triangular areas between the arms of each bend in the bar 18, and about the mesh 16, is molded a triangular block of rubber or other like resilient material 22 so that a portion of the expanded mesh is embedded in each of the blocks 22. The resilient triangular blocks 22, as will be seen in Figs. 1, 3 and 6, are thicker adjacent the bases thereof, so as to provide tread material over that part of the expanded metal band which is bulged upwardly between the arms of the zigzag bar. This results in a composite rubber-steel tread surface for the wheel 10.

These treads are secured to the vehicle wheel as follows:

In the form of wheel shown in Fig. 1, the rim thereof is sufficiently thick in cross section to permit a plurality of holes 24 to be drilled or otherwise formed therein. These are equally spaced around the entire rim of the wheel. The composite tread for the wheel is placed upon the rim as indicated in Figs. 1 and 3 and a pair of circular bezels 26 is applied, one on each side of the rim margin, and which bezels have an internal marginal flange 28 which overlaps the edge of the composite tread. The bezels are provided with a plurality of spaced holes which register with the holes 24 in the rim and bolts 30 pass through said registering holes and hold the composite tread securely in position upon the rim.

In the form of wheel rim shown in Fig. 6, the rim is not as thick as that shown in Fig. 1 and thus the holes 32 extend through the rim flange, but opposite holes are axially alined. The bezels in this modification are thus held to the rim with tap bolts 34. In this modification the bezels are provided with projecting knobs 36 which embed themselves in the resilient blocks 22, or seat in pockets formed therein, when the bolts 34 are tightened.

In operation upon average ground or road surfaces, the rubber material in contact with the ground extends over a reasonably broad surface and grips this broad surface with the rubber blocks 22. When, however, the wheel tread is in contact with a steel rail 38 as shown in Fig. 3, the obtainable width of contact is limited by the width of the rail head, and the length of the contact area is limited by the radius of the wheel and deflection of the tread surface. Upon such circumstances of load concentration, when a heavy load is placed on the vehicle, the rubber blocks on the tread surface will deflect as shown, permitting the major part of the normal load to be carried by the sinuous steel rib, which transfers the load directly in compression to the perimeter of the drive wheel. The frictional, traction, or driving load tangent to the tread surface is transmitted from the wheel to the composite tread block by means of lugs engaging depressions in the rubber at the sides of the blocks. These forces are then transmitted either to the center of the tread blocks or to the sinuous steel bar 18 by means of expanded steel mesh 16 embedded in and vulcanized to the rubber blocks 22. As before mentioned, this mesh is steel, brass plated for best adhesion to the rubber in the vulcanizing process, and is also brazed to the sinuous steel tread member 18 before a final forming of the block. This steel mesh 16 serves to provide distribution of the shear load or traction load from side attachment lugs to both the rubber tread blocks 22 and the sinuous steel tread member 18, preventing localized failure or tearing of these members in shear. Since the entire tread assembly is a reinforced rubber vulcanized body, its inside surface, which matches a smooth wheel surface beneath, presents at the interface a smooth rubber surface with no opportunity for the entry of water or corrosive salts, thus preventing ingress of corrosive media to make the removal and replacement of the tread blocks difficult.

I claim:

1. A vehicle traction wheel assembly, comprising a wheel rim, having a cylindrical outer surface, an open mesh annular band encircling said outer surface, a tortuous zigzag bar secured on one edge to the central portion of said band, and continuing completely therearound, said annular band being bulged upwardly between arms in a bend of said tortuous bar, individual resilient blocks molded about the open mesh band between bends in said bar, and means securing said mesh, bar and resilient blocks to said wheel rim.

2. The structure set forth in claim 1, wherein said resilient blocks are triangular and thicker adjacent their bases, the vertexes of said blocks being in the bends of the band, and the bases in the plane of the outer edge of said band.

3. A composite steel-rubber traction tread for a vehicle wheel having a cylindrical outer surface, said tread comprising a cylindrical open mesh band for encircling said outer surface and approximating the width thereof, a zigzag bar secured on edge to the central portion of said band, said band being bulged upwardly forming a segment of a hollow cone between adjacent arms in said band, and individual triangular blocks molded about said open mesh band between arms of said bar, and annular bezels for securing said traction tread to said outer surface.

References Cited in the file of this patent

UNITED STATES PATENTS

| | | |
|---|---|---|
| 780,542 | Tomassek et al. | Jan. 24, 1905 |
| 1,140,370 | Gammeter | May 25, 1915 |
| 1,227,348 | Wale | May 22, 1917 |
| 1,780,627 | Muller | Nov. 4, 1930 |
| 2,764,213 | Simpson | Sept. 25, 1956 |